(12) United States Patent
Yoshida

(10) Patent No.: US 7,239,441 B2
(45) Date of Patent: Jul. 3, 2007

(54) RAMAN AMPLIFICATION REPEATER (75) Inventor: Fumisato Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 80 days.

(21) Appl. No.: 10/936,186

(22) Filed: Sep. 8, 2004

(65) Prior Publication Data
US 2005/0078355 A1 Apr. 14, 2005

(30) Foreign Application Priority Data
Sep. 22, 2003 (JP) ............................. 2003-330574

(51) Int. Cl.
H01S 3/00 (2006.01)
(52) U.S. Cl. .................. 359/337.12; 359/334
(58) Field of Classification Search ........... 359/337.12, 359/334
See application file for complete search history.

(56) References Cited

U.S. PATENT DOCUMENTS 6,292,288 B1 * 9/2001 Akasaka et al. ............ 359/334
6,542,287 B1 * 4/2003 Ye et al. ..................... 359/334
6,606,188 B2 * 8/2003 Shimojoh ................... 359/334
6,879,434 B2 * 4/2005 Aoki et al. .................. 359/334
2005/0100343 A1 * 5/2005 Yoshida ...................... 398/177

FOREIGN PATENT DOCUMENTS

JP 2001-007768 1/2001

* cited by examiner

Primary Examiner—Deandra M. Hughes
(74) Attorney, Agent, or Firm—Scully, Scott, Murphy & Presser, P.C.

(57) ABSTRACT

A Raman amplification repeater using the amplification function of a signal light caused by Raman scattering which occurs when a pumping light is applied to a transmission path fiber, in which signal light power is monitored by means of a plurality of PDs by using wavelengths for monitoring whose number is larger than the number of pumping light wavelengths to control output power of a pumping light LD which emits the pumping light.

14 Claims, 6 Drawing Sheets

RAMAN AMPLIFICATION REPEATER

BACKGROUND OF THE INVENTION

1. Field of the Invention

The present invention relates to a Raman amplification repeater using the amplification function of a signal light caused by Raman scattering which occurs when a pumping light LD is applied to a transmission path fiber and, more particularly, a Raman amplification repeater which enables control of Raman amplification.

2. Description of the Related Art

For meeting an increasing demand for communication created as the Internet has been widely used, transmission capacities of optical transmission systems forming a basic communication network have been recently increased at a surprising speed.

In order to cope with such a rapid increase in transmission capacity, optical wavelength division multiplexing techniques (WDM technique) have been established to enable transmission data capacities to be increased. In a long-distance transmission system, however, expansion of a repeating interval is a target which is hard to achieve as well as scale-up of a transmission capacity.

Under these circumstances, for ensuring a signal to noise power ratio (optical SN ratio) per one wavelength and mitigating transmission waveform distortion caused by the fiber nonlinear effect, proposed is a transmission method, called Raman amplification, of canceling a loss of a transmission path. In this method, in order to realize long-distance transmission, required is flat gain characteristics as well as reduction in the fiber nonlinear effect and reduction in noise.

Structure and operation of a conventional repeater using Raman amplification will be described with reference to FIG. 8.

Figure 8:
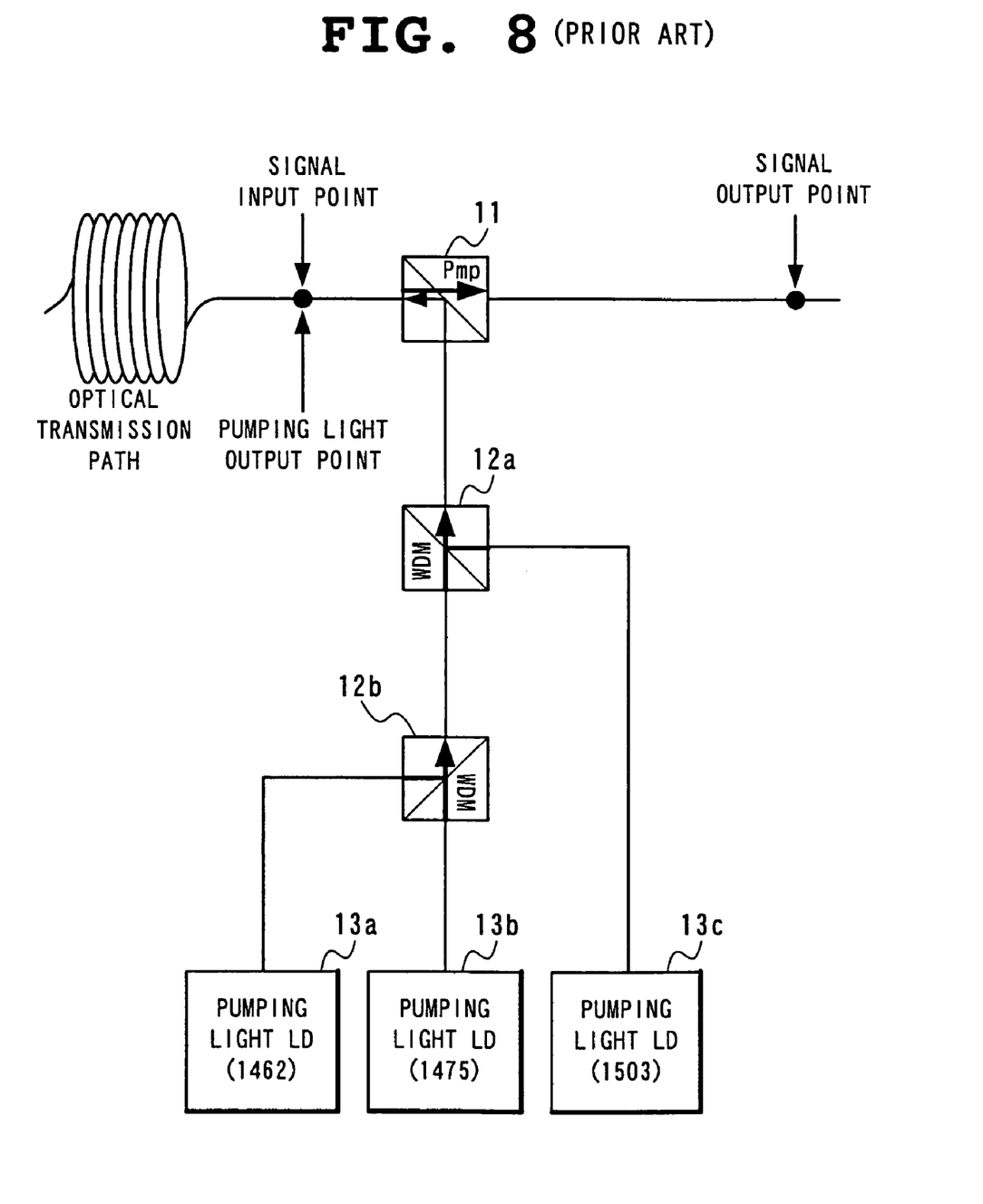
FIG. 8 is a block diagram showing one example of a structure of a conventional Raman amplification repeater.

In FIG. 8, wavelengths of pumping light LDs (Laser Diode) 13a, 13b and 13c are 1462.4 nm, 1475.0 nm and 1503.1 nm, respectively, and a signal wavelength band ranges from 1574 to 1609 nm. After being multiplexed by WDM (Wavelength Division Multiplex) couplers 12a and 12b, pumping lights are multiplexed by a pumping light WDM coupler 11 with a signal light on an optical transmission path in the reverse direction to each other. Pumping light output from a pumping light output point onto the optical transmission path amplifies, in the optical transmission path, a signal light band which is about 13.2 THz apart from the pumping light.

First, by using an appropriate transmission path fiber, obtain output power of the pumping light LDs 13a, 13b and 13c having different wavelengths so as to have a flat gain spectrum after, for example, 10 dB Raman amplification.

Figure 9:
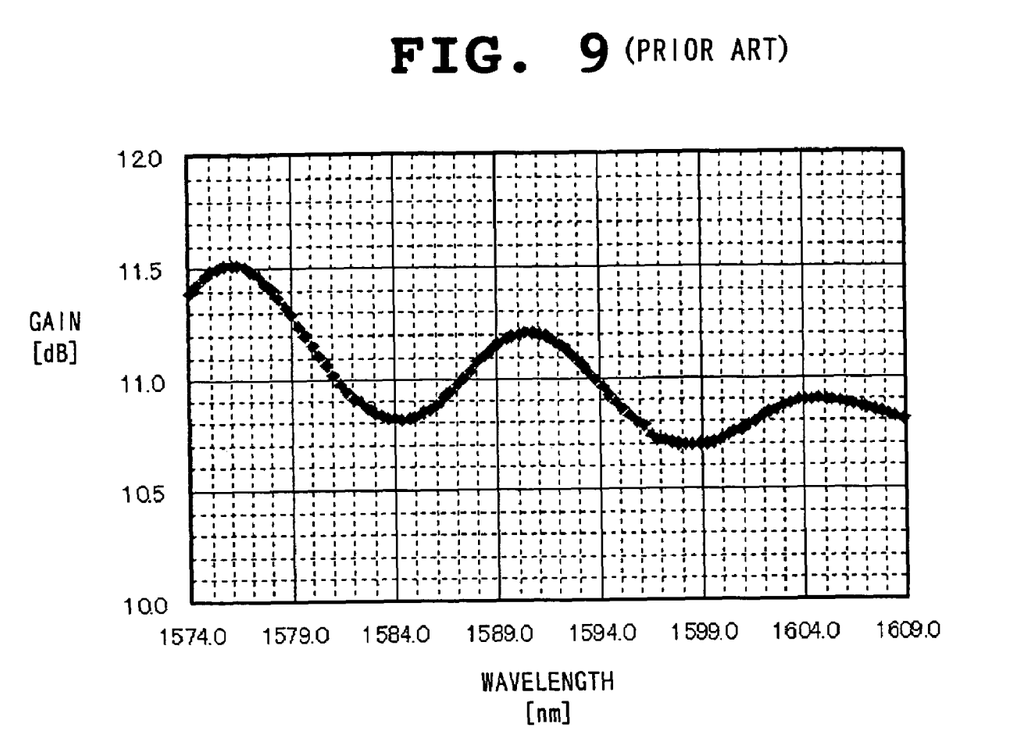
FIG. 9 is a diagram showing a gain spectrum obtained when Raman amplification is conducted by the conventional Raman amplification repeater.

Next, make connection to an actual transmission path fiber and operate the respective pumping light LDs 13a, 13b and 13c by the pumping light output power obtained before the connection to the transmission path to conduct Raman amplification. FIG. 9 shows a gain spectrum obtained when Raman amplification is conducted by the above-described conventional Raman amplification repeater.

As shown in FIG. 9, with the Raman amplification repeater having such a structure as shown in FIG. 8, even when the output power of the pumping light LDs 13a, 13b and 13c having different wavelengths is obtained so as to have a flat gain spectrum after Raman amplification, it is difficult to keep the gain spectrum within a signal band be flat because of a difference in transmission path fibers or in intra-office losses or the like.

In order to solve such a problem, the wavelength characteristic control method of optical transmission power by Raman amplification disclosed in Japanese Patent Laying-Open (Kokai) No. 2001-7768 (Literature 1), for example, shows a technique of controlling gain wavelength characteristics of Raman amplification by monitoring wavelength characteristics of optical transmission power as of after Raman amplification by two PDs (Photo Diode). Use of such a method aims at keeping a gain spectrum be flat by mitigating effects produced by a difference in transmission path fibers or in intra-office losses or the like.

As described in the foregoing, conventional Raman amplification repeaters have the difficulty in keeping a gain spectrum within a signal band be flat due to a difference in a transmission path fiber or in intra-office losses or the like.

On the other hand, the wavelength characteristic control method of optical transmission power by Raman amplification as disclosed in Literature 1, which controls only an inclination of a wavelength spectrum by monitoring only the opposite sides of the wavelength spectrum or controls only a wavelength at the top (a part having high power) of the wavelength spectrum, has a shortcoming that flatness of an output spectrum can not be satisfactorily maintained in a case, for example, where a signal light whose spectrum has an inclination is applied.

SUMMARY OF THE INVENTION

The object of the present invention is to provide a Raman amplification repeater capable of conducting, irrespective of a spectrum configuration of an applied signal light, amplification while all the time maintaining a flat output spectrum within a signal band.

According to the first aspect of the invention, A Raman amplification repeater using the amplification function of a signal light caused by Raman scattering which occurs when a pumping light is applied to a transmission path fiber, comprising a control unit which controls output power of a pumping light LD that emits the pumping light by monitoring signal light power by wavelengths for monitoring whose number is more than the number of the pumping light wavelengths and equal to the number of signal lights or less.

In the preferred construction, at least one of the monitoring wavelengths is set to be a wavelength of a part of a spectrum of a signal light whose power is low after Raman amplification.

In another preferred construction, at least one of the monitoring wavelengths is set to be a wavelength of a part of a spectrum of a signal light whose power is high after Raman amplification.

In another preferred construction, at least one of the monitoring wavelengths is set to be a wavelength of a part of a spectrum of a signal light whose power is low or a part whose power is high after Raman amplification.

In another preferred construction, at least one of the monitoring wavelengths is set to be a wavelength of a part of a spectrum of a signal light whose power is low after Raman amplification, and output power of the pumping light LD is controlled such that power of a spectrum at the monitoring wavelength which is set at a part of a spectrum of a signal light whose power is low attains a target value set in advance.

In another preferred construction, at least one of the monitoring wavelengths is set to be a wavelength of a part of a spectrum of a signal light whose power is high after Raman amplification, and output power of the pumping light LD is controlled such that power of spectra at a plurality of the monitoring wavelengths which are set at a part of a spectrum of a signal light whose power is high attains the same value.

In another preferred construction, at least one of the monitoring wavelengths is set to be a wavelength of a part of a spectrum of a signal light whose power is low or a part whose power is high after Raman amplification, and output power of the pumping light LD is controlled such that power of spectra at a plurality of the monitoring wavelengths which are set at a part of a spectrum of a signal light whose power is high attains the same value.

In another preferred construction, at least one of the monitoring wavelengths is set to be a wavelength of a part of a spectrum of a signal light whose power is high after Raman amplification, output power of the pumping light LD is controlled such that power of spectra at a plurality of the monitoring wavelengths which are set at a part of a spectrum of a signal light whose power is high attains the same value, and output power of the pumping light LD which emits the pumping light that amplifies the signal light of the monitoring wavelength is controlled such that spectra at the plurality of monitoring wavelengths have no difference in power.

According to another aspect of the invention, a Raman amplification control method in a Raman amplification repeater using the amplification function of a signal light caused by Raman scattering which occurs when a pumping light is applied to a transmission path fiber, including the step of controlling output power of a pumping light LD which emits the pumping light by monitoring signal light power by using wavelengths for monitoring whose number is more than the number of the pumping light wavelengths and equal to the number of signal lights or less.

In the preferred construction, the Raman amplification control method, further including the step of setting at least one of the monitoring wavelengths to be a wavelength of a part of a spectrum of a signal light whose power is low after Raman amplification.

In another preferred construction, the Raman amplification control method, further including the step of setting at least one of the monitoring wavelengths to be a wavelength of a part of a spectrum of a signal light whose power is high after Raman amplification.

In another preferred construction, the Raman amplification control method, further including the steps of setting at least one of the monitoring wavelengths to be a wavelength of a part of a spectrum of a signal light whose power is low after Raman amplification, and controlling output power of the pumping light LD such that power of a spectrum at the monitoring wavelength which is set at a part of a spectrum of a signal light whose power is low attains a target value set in advance.

In another preferred construction, the Raman amplification control method, further including the steps of setting at least one of the monitoring wavelengths to be a wavelength of a part of a spectrum of a signal light whose power is high after Raman amplification, and controlling output power of the pumping light LD such that power of spectra at a plurality of the monitoring wavelengths which are set at a part of a spectrum of a signal light whose power is high attains the same value.

In another preferred construction, the Raman amplification control method, further including the steps of setting at least one of the monitoring wavelengths to be a wavelength of a part of a spectrum of a signal light whose power is high after Raman amplification, controlling output power of the pumping light LD such that power of spectra at a plurality of the monitoring wavelengths which are set at a part of a spectrum of a signal light whose power is high attains the same value, and controlling output power of the pumping light LD which emits the pumping light that amplifies the signal light of the monitoring wavelength such that spectra at the plurality of monitoring wavelengths have no difference in power.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

In the following, a preferred embodiment of the present invention will be described in detail with reference to the drawings.

Figure 1:
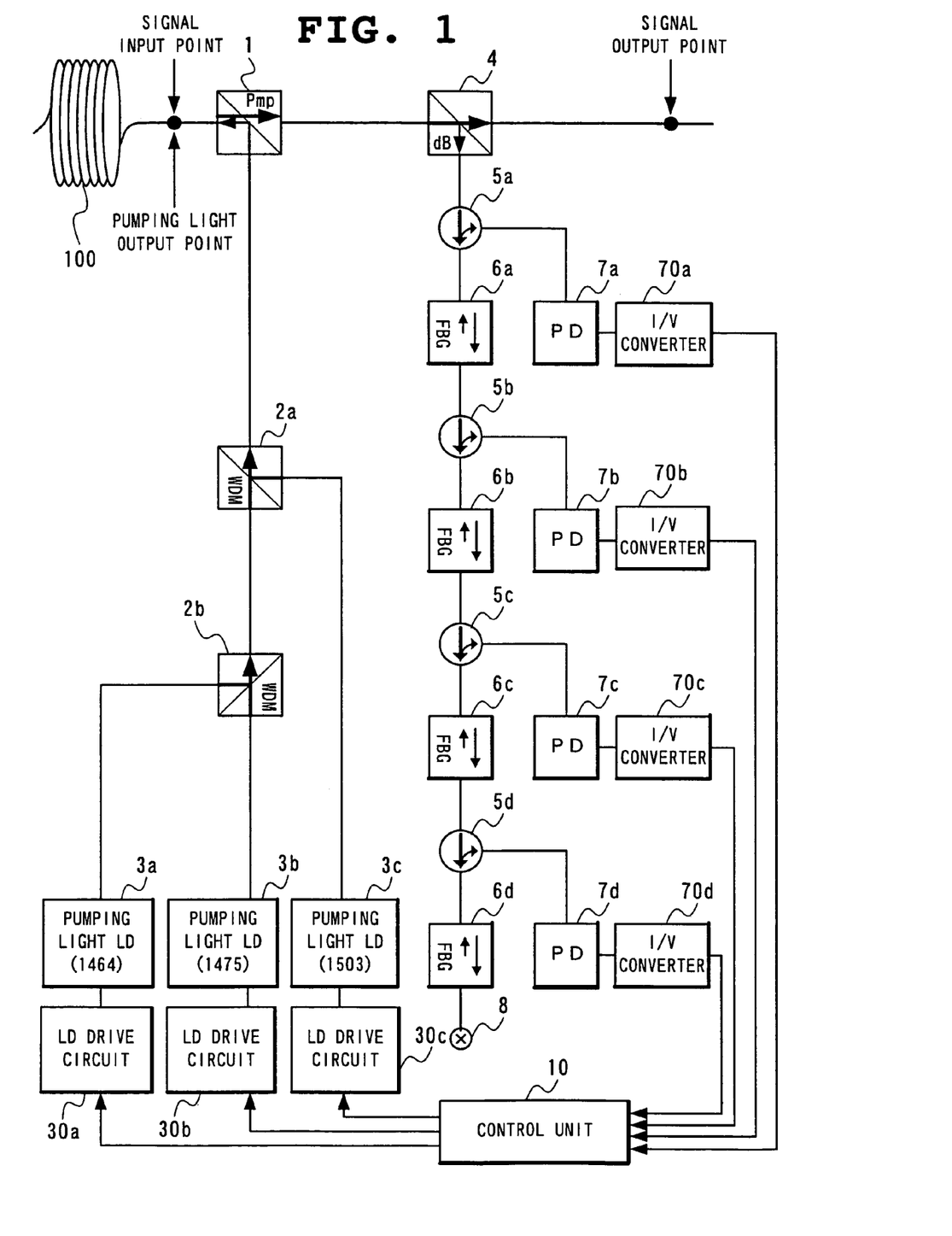
FIG. 1 is a block diagram showing a structure of a Raman amplification repeater according to a preferred embodiment of the present invention.

FIG. 1 is a block diagram showing a structure of a Raman amplification repeater using the function of signal light amplification caused by Raman scattering when a pumping light LD is applied to a transmission path fiber according to a preferred embodiment of the present invention.

The Raman amplification repeater according to the present embodiment shown in FIG. 1 includes a pumping light WDM (Wavelength Division Multiplex) coupler 1, WDM couplers 2a and 2b, pumping light LDs (Laser Diode) 3a, 3b and 3c, a branch coupler 4, optical circulators 5a, 5b, 5c and 5d, FBGs (Fiber Bragg Grating) 6a, 6b, 6c and 6d, PDs (Photo Diode) 7a, 7b, 7c and 7d, LD drive circuits 30a, 30b and 30c, I/V converters 70a, 70b, 70c and 70d, a non-reflective termination 8 and a control unit 10.

The Raman amplification repeater according to the present embodiment, as illustrated in FIG. 1, has a structure in which the number of PDs 7a, 7b, 7c and 7d for monitoring is larger than that of the pumping light LDs 3a, 3b an 3c, that is, the number of monitoring wavelengths is larger than the number of pumping light wavelengths.

The pumping light LDs 3a, 3b and 3c, which are light sources that output pumping lights whose wavelengths are different in order to amplify a signal light, are multiplexed by the WDM couplers 2a and 2b which multiplex lights having different wavelengths.

The pumping light WDM coupler 1 is a unit which multiplexes a signal light on an optical transmission path 100 and the pumping lights, and the pumping lights are multiplexed with the signal light in the reverse direction to each other and output from a pumping light output point to the optical transmission path 100.

The branch coupler 4 branches a signal light applied through a signal input point by a certain ratio.

The optical circulators 5a, 5b, 5c and 5d each have three light input/output ports, in which lights are coupled according to the light proceeding directions by using the Faraday effects and output through different ports, while the FBGs 6a, 6b, 6c and 6d reflect only a light of a certain specific wavelength.

The PDs 7a, 7b, 7c and 7d convert light signals into electric signals and receive the same, while the non-reflective termination 8 brings an applied light to a non-reflective state without reflecting the same.

The I/V converters 70a, 70b, 70c and 70d convert current signals which have been converted by the PDs 7a, 7b, 7c and 7d into voltage signals.

The control unit 10 receives input of an electric signal output from the PDs 7a, 7b, 7c and 7d through the I/V converts 70a, 70b, 70c and 70d. And the control unit 10 controls the LD drive circuits 30a, 30b and 30c of the pumping light LDs 3a, 3b and 3c according to a value of the received electric signal so as to obtain a flat signal output as will be described later.

This control unit 10 is realized by a program-controlled CPU or the like.

Next, operation of thus structured Raman amplification repeater according to the present embodiment will be described with reference to the drawings.

In FIG. 1, wavelengths of the pumping light LDs 3a, 3b and 3c are 1462.4 nm, 1475.0 nm and 1503.1 nm and the signal wavelength band ranges from 1574 to 1609 nm. Signal light wavelengths reflected at the FBGs 6a, 6b, 6c and 6d and received by the PDs 7a, 7b, 7c and 7d are 1576.4 nm, 1583.7 nm, 1590.8 nm and 1598.5 nm, respectively, and a branch ratio of the branch coupler 4 is 13 dB.

In addition, insertion losses of the pumping light WDM coupler 1, the optical circulators 5a, 5b, 5c and 5d and the FBGs 6a, 6b, 6c and 6d are 0.5 dB.

Figure 2:
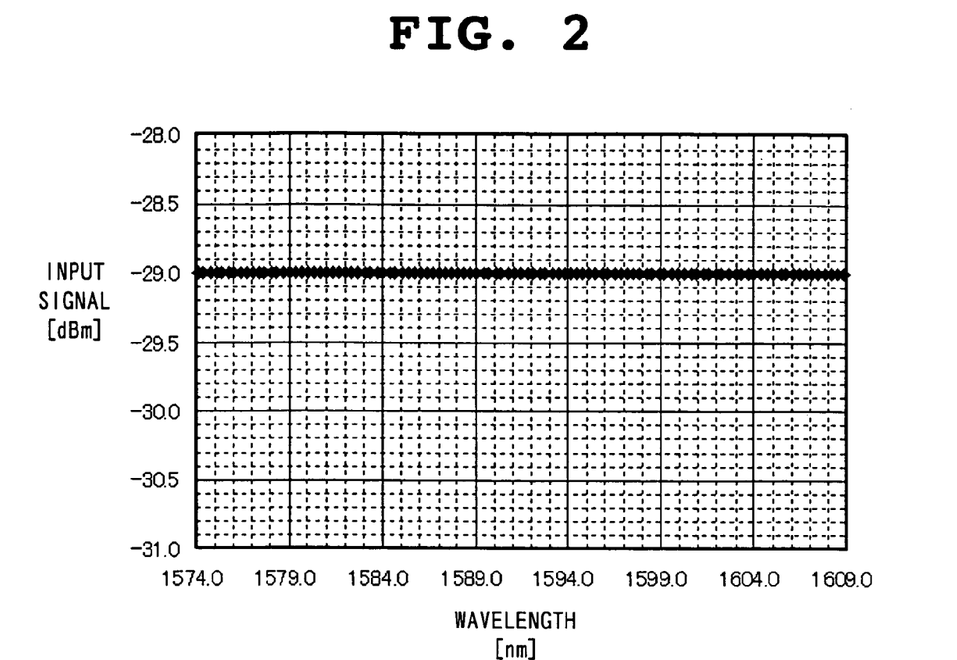
FIG. 2 is a diagram showing a spectrum of a signal light entering through a signal input point of an optical transmission path.

First, consideration will be given to a case where when the signal light whose spectrum is shown in FIG. 2 is applied from the signal input point, no Raman amplification is conducted.

The signal light having the wavelength of 1576.4 nm which enters from the signal input point on the optical transmission path 100 passes through the pumping light WDM coupler 1, the branch coupler 4, the optical circulator 5a, the FBG 6a and again through the optical circulator 5a and is received as the signal light whose power is −44 dBm by the PD 7a.

Similarly, the signal lights having the wavelengths of 1583.7 nm, 1590.8 nm and 1598.5 nm are received by the PD 7b, the PD 7c and the PD 7d as the signal lights of −45 dBm, −46 dBm and −47 dBm, respectively.

Next, consideration will be given to a case where the pumping light LDs 3a, 3b and 3c are driven to obtain a Raman gain of 10 dB. At this time, assume that a maximum value of a gain in a signal band is 10 dB and gain deflection is within 5% of the gain. A pumping light emitted from the pumping light output point onto the optical transmission path 100 is assumed to amplify, in the optical transmission path, a signal light band about 13.2 THz apart from the pumping light.

The signal light having the wavelength of 1576.4 nm which is amplified and applied through the signal input point is received by the PD 7a. Similarly, the signal lights having the wavelengths of 1583.7 nm, 1590.8 nm and 1598.5 nm are also amplified and received by the PDs 7b, 7c and 7d, respectively.

Since the present embodiment employs three wavelengths for a pumping light, a gain within a signal band can be controlled to be flatter than that of a case using signal light values of four wavelengths.

Since 1583.7 nm and 1598.5 nm monitored by the PD 7b and PD 7d are wavelengths at which a minimum value of the gain is obtained, control target values will be −45 dBm+10 dB=−35 dBm and −47 dBm+10 dB=−37 dBm, respectively.

At this time, by controlling the LD drive circuits 30b and 30d by the control unit 10, change output power of the pumping light LD 3b in order to set a detection value to be obtained by the PD 7b and change output power of the pumping light LD 3c in order to set a detection value to be obtained by the PD 7d.

On the other hand, although 1576.4 nm and 1590.8 nm monitored by the PD 7a and the PD 7c are wavelengths at which the maximum value of the gain is obtained, because the two wavelengths are not absolute values of a gain and a flat gain is obtained within a signal band by conducting control such that gains at the two wavelengths coincide with each other, such control is conducted to obtain a control target value that when a difference between the PD 7a and the PD 7c is (−44 dBm+G[dB])−(−46 dBm+G[dB])=2 dB, if the values of the PD 7a and the PD 7c hold (PD 7a<PD 7c+2), output power of the pumping light LD 3a is increased and output power of the pumping light LD 3a is decreased if (PD 7a>PD 7c+2) holds.

Figure 3:
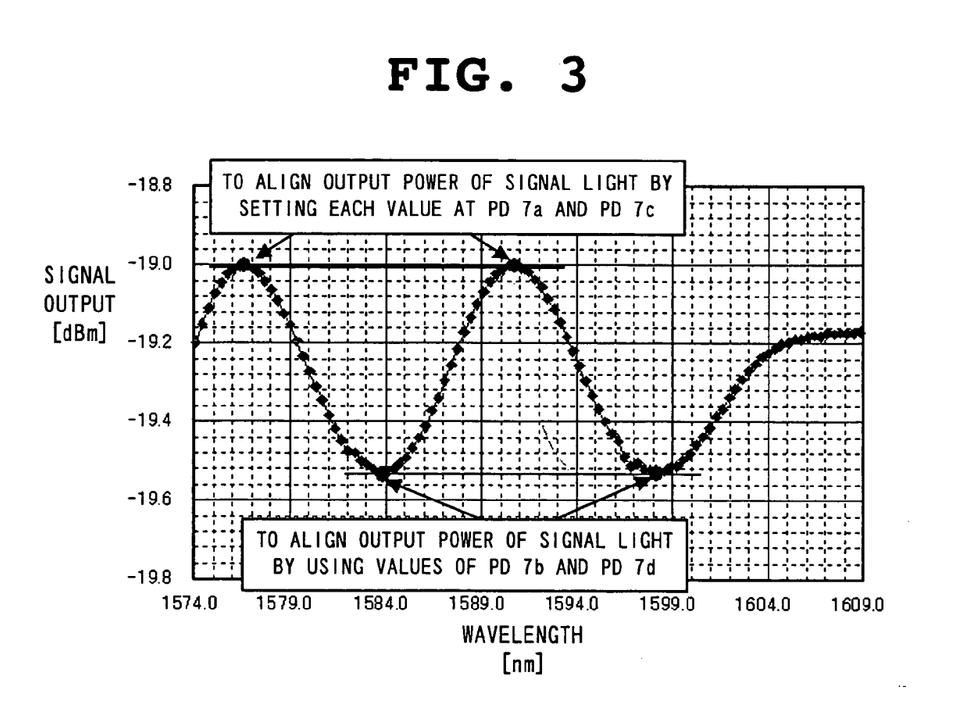
FIG. 3 is a diagram showing an output spectrum obtained when gain control is conducted by the Raman amplification repeater according to the embodiment of the present invention in a case where the signal light having the spectrum illustrated in FIG. 2 enters.

By conducting the above-described gain control to align received light power at the PDs 7a, 7b, 7c and 7d to a control target value, such a flat output spectrum as shown in FIG. 3 is obtained, which is an output spectrum at the signal output point of the Raman amplification repeater.

Figure 4:
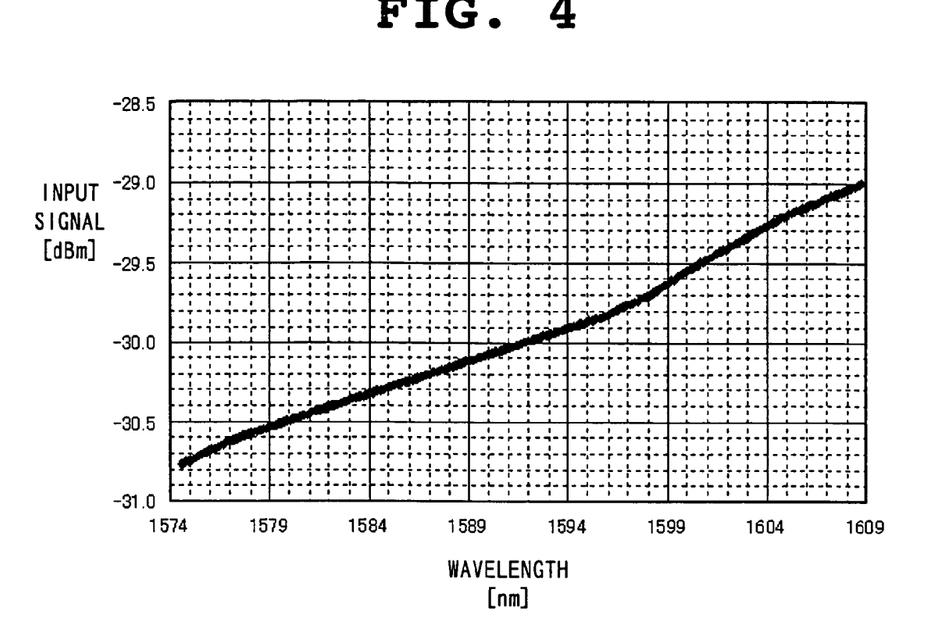
FIG. 4 is a diagram showing a spectrum of a signal light having an inclination which enters through the signal input point of the optical transmission path.

Next, consideration will be made of a case where when a signal light having the spectrum shown in FIG. 2 enters through the signal input point, at the time of Raman amplification operation with a gain of 10 dB, the signal spectrum in the transmission path slants for one reason or another, so that a signal light with the spectrum having an inclination as shown in FIG. 4 enters through the signal input point.

Figure 5:
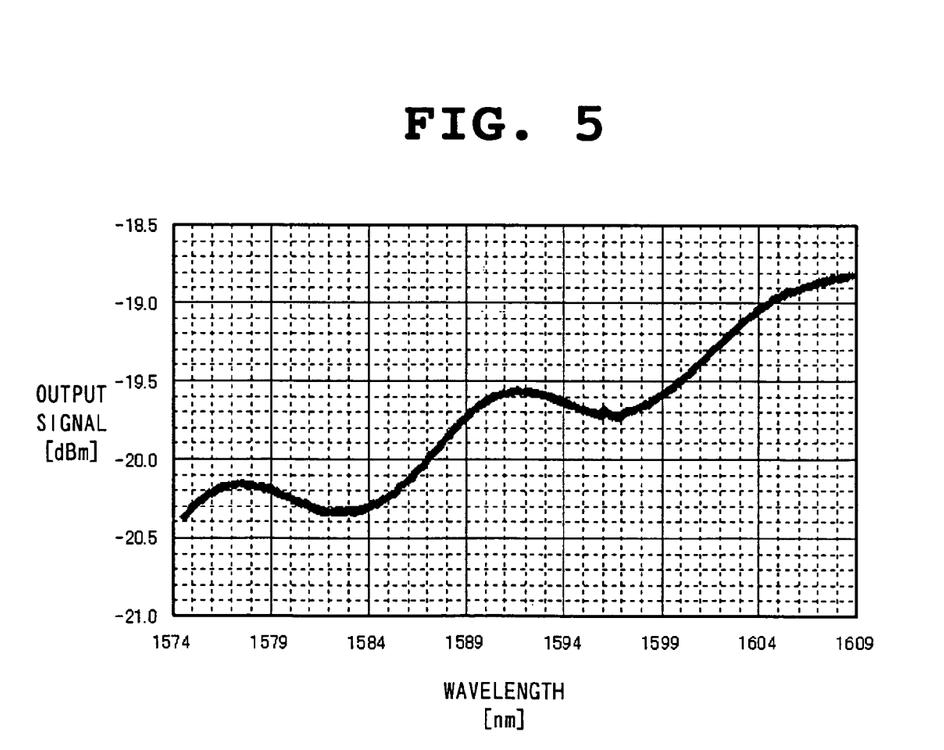
FIG. 5 is a diagram showing a spectrum of a signal light emitted at a signal output point at the instant when the signal light having the spectrum shown in FIG. 4 enters.

First, at the instant when the signal light with the spectrum shown in FIG. 4 enters through the signal input point, in order to amplify a signal light applied to the optical transmission path 100 by a flat gain within a signal band, a signal light having a spectrum shown in FIG. 5 is emitted at the signal output point in the Raman amplification repeater according to the present embodiment.

At this time, the value of the PD 7b which receives the signal light having the wavelength of 1583.7 nm attains −36.27 dBm and the value detected by the PD 7d which receives the signal light of 1598.5 nm attains −37.59 dBm, which deviate from the control target value. Here, adjust output power of the pumping light LD 3b and LD 3c such that signal light power of the wavelength of 1583.7 nm received by the PD 7b attains −35 dBm and signal light power of the wavelength of 1598.5 nm received by the PD 7d attains −37 dBm.

In addition, since the signal light power received by the PD 7a and the PD 7c holds (PD 7a<PD 7c+2), by adjusting the output power of the pumping light LD 3a to return to the control target value of 2 dB as a difference between the PD 7a and the PD 7c, the signal light power of the wavelengths of 1583.7 nm and 1598.5 nm at the signal output point will be −19 dBm and the signal light power of the wavelengths of 1576.4 nm and 1590.8 nm will be −18.47 dBm.

Figure 6:
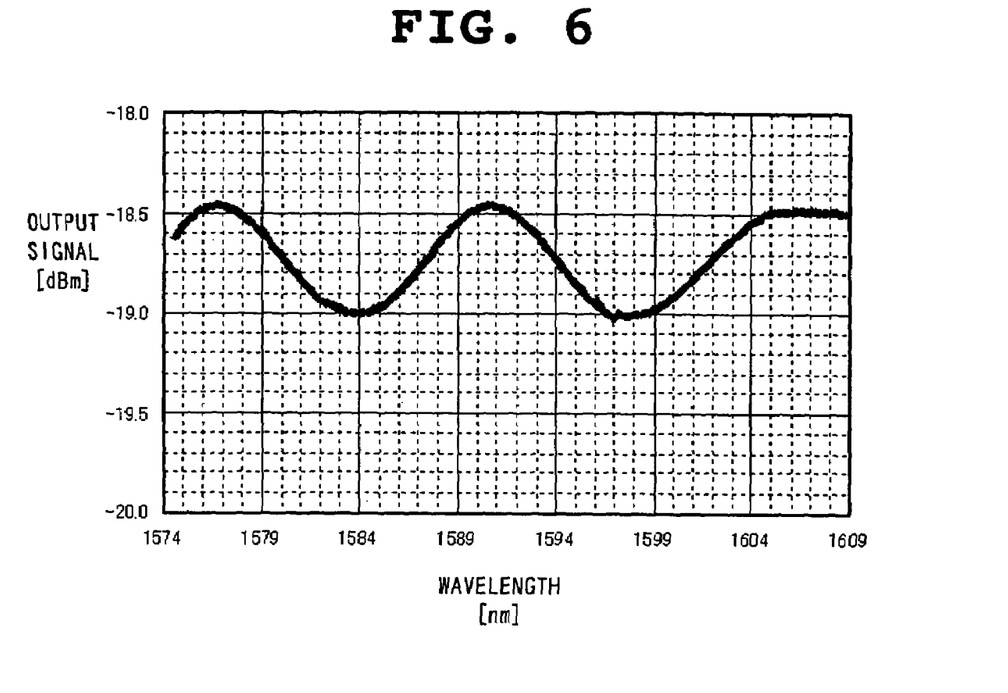
FIG. 6 is a diagram showing an output spectrum obtained when gain control is conducted by the Raman amplification repeater according to the embodiment of the present invention in a case where the signal light having the spectrum illustrated in FIG. 4 enters.

FIG. 6 shows an output spectrum at the signal output point of the Raman amplification repeater obtained in a case where monitoring control by the PDs 7a, 7b, 7c and 7d is conducted when the signal light having the spectrum shown in FIG. 4 enters. It can be found here that adjusting the received light power at the PDs 7a, 7b, 7c and 7d to the control target value obtains an output spectrum having the lowest output signal power of −19 dBm and the degree of flatness of 0.56 dB in the signal wavelength band.

Figure 7:
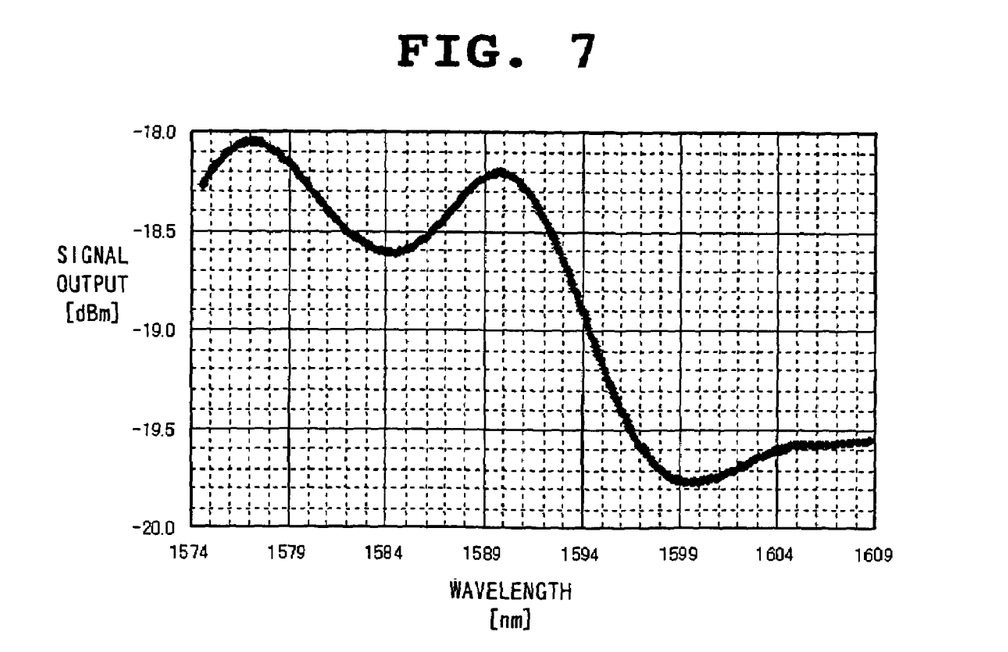
FIG. 7 is a diagram showing an output spectrum obtained when no monitoring control is conducted in a case where the signal light having the spectrum illustrated in FIG. 4 enters.

On the other hand, when the signal light having the spectrum shown in FIG. 4 enters, if monitoring control by the PDs 7a, 7b, 7c and 7d is not conducted, control target values of the pumping light LDs 3a, 3b and 3c can not be determined, resulting in largely degrading the degree of flatness. One example of output spectrums obtained in this case is shown in FIG. 7. Since the control target value of each of the pumping light LDs 3a, 3b and 3c is unknown, the output spectrum has the lowest output power of −19.76 dBm and the degree of flatness of 1.72 dB in the signal band, so that it can be found that as compared with the case where monitoring control by the PDs 7a, 7b, 7c and 7d is conducted as shown in FIG. 6, the degree of flatness is largely degraded.

According to the present embodiment, by controlling the top and the bottom of a wavelength spectrum formed by Raman amplification through the monitoring by four PDs 7a, 7b, 7c and 7d, maximum and minimum output powers of a signal in a signal band can be defined, so that a flatter output spectrum with a ripple reduced as much as possible can be obtained.

With the above-described Raman amplification repeater according to the present embodiment, irrespective of a spectrum configuration of an input signal light, the signal light is amplified while all the time maintaining a flat output spectrum within a signal band, resulting in obtaining a flatter output spectrum. The reason is that the number of signal lights to be monitored in the signal wavelength band is increased and output power of pumping light LDs having different wavelengths is adjusted to make an output spectrum be flat, thereby controlling a gain of the signal light in the band.

Although the present invention has been described with respect to the preferred embodiment in the foregoing, the present invention is not always limited to the above-described embodiment and can be embodied in various forms within the range of its technical idea.

Although the above-described embodiment employs three different pumping light wavelengths of 1462.4 nm, 1475.0 nm and 1503.1 nm, the present invention can be realized also by changing a pumping light wavelength and the number of pumping light wavelengths.

Although signal lights of four wavelengths are monitored by the PD to control three pumping light LDs having different wavelengths, the present invention is not limited to the number of wavelengths according to the present embodiment as long as the number of signal lights monitored by the PD is not less than the number of pumping light wavelengths and not more than the number of the signal lights.

While the present embodiment employs a signal light for controlling a pumping light LD, the present invention can be realized also by using a monitoring signal which is separate from a signal light.

Moreover, while after the pumping light WDM coupler 1, a signal light is monitored by a PD to control pumping light LDs having different wavelengths in the present embodiment, the present invention can be realized also by changing a place where the PD which monitors a signal light is disposed.

While in the present embodiment, the signal wavelength band is set to range from 1574 to 1609 nm, the present invention is not limited to the signal wavelength band of the present embodiment and can be realized also by changing a band.

Furthermore, although in the present embodiment, a branch ratio of the coupler which branches a signal light is set to be 13 dB, the present invention is not limited to the branch ratio of the branch coupler.

The Raman amplification repeater according to the present invention achieves such excellent effects as set forth below.

Irrespective of a spectrum configuration of an input signal light, the Raman amplification repeater amplifies the signal light while maintaining a flat output spectrum within a signal band all the time, thereby obtaining a flatter output spectrum. The reason is that the number of signal lights to be monitored in the signal wavelength band is increased and output power of pumping light LDs having different wavelengths is adjusted so as to make the output spectrum be flat, thereby controlling a gain of the signal light within the band.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A Raman amplification repeater using the amplification function of a signal light caused by Raman scattering effect when a pumping light is applied to a transmission path fiber, comprising
a control unit which controls output power of a pumping light laser diode (LD) that emits said pumping light at various wavelengths, said control unit monitoring signal light power according to wavelengths;
two or more photodetectors coupled to said control unit, wherein the number of said photodetectors is larger than the number of wavelengths of said pumping light, and wherein the number of said photodetectors is less than or equal to the number of signal lights.

2. The Raman amplification repeater as set forth in claim 1, wherein
at least one of said various wavelengths is set to be a wavelength of a part of a spectrum of a signal light whose power is low after Raman amplification.

3. The Raman amplification repeater as set forth in claim 1, wherein
at least one of said various wavelengths is set to be a wavelength of a part of a spectrum of a signal light whose power is high after Raman amplification.

4. The Raman amplification repeater as set forth in claim 1, wherein
at least one of said various wavelengths is set to be a wavelength of a part of a spectrum of a signal light whose power is low or a part whose power is high after Raman amplification.

5. The Raman amplification repeater as set forth in claim 1, wherein
at least one of said various wavelengths is set to be a wavelength of a part of a spectrum of a signal light whose power is low after Raman amplification, and
output power of said pumping light LD is controlled such that power of a spectrum at said monitoring wavelength which is set at a part of a spectrum of a signal light whose power is low attains a target value set in advance.

6. The Raman amplification repeater as set forth in claim 1, wherein
at least one of said various wavelengths is set to be a wavelength of a part of a spectrum of a signal light whose power is high after Raman amplification, and
output power of said pumping light LD is controlled such that power of spectra at a plurality of said monitoring wavelengths which are set at a part of a spectrum of a signal light whose power is high attains the same value.

7. The Raman amplification repeater as set forth in claim 1, wherein
at least one of said various wavelengths is set to be a wavelength of a part of a spectrum of a signal light whose power is low or a part whose power is high after Raman amplification, and
output power of said pumping light LD is controlled such that power of spectra at a plurality of said monitoring wavelengths which are set at a part of a spectrum of a signal light whose power is high attains the same value.

8. The Raman amplification repeater as set forth in claim 1, wherein
at least one of said various wavelengths is set to be a wavelength of a part of a spectrum of a signal light whose power is high after Raman amplification,
output power of said pumping light LD is controlled such that power of spectra at a plurality of said monitoring wavelengths which are set at a part of a spectrum of a signal light whose power is high attains the same value, and
output power of said pumping light LD which emits the pumping light that amplifies said signal light of said monitoring wavelength is controlled such that spectra at said plurality of monitoring wavelengths have no difference in power.

9. A Raman amplification control method in a Raman amplification repeater using the amplification function of a signal light caused by Raman scattering effect when a pumping light is applied to a transmission path fiber, including the step of:
controlling output power of a pumping light laser diode (LD) which emits said pumping light at various wavelengths by monitoring with two or more photodetectors signal light power according to wavelengths, wherein the number of said photodetectors is larger than the number of wavelengths of said pumping light, and wherein the number of said photodetectors is less than or equal to the number of signal lights.

10. The Raman amplification control method as set forth in claim 9, further including the step of
setting at least one of said various wavelengths to be a wavelength of a part of a spectrum of a signal light whose power is low after Raman amplification.

11. The Raman amplification control method as set forth in claim 9, further including the step of
setting at least one of said various wavelengths to be a wavelength of a part of a spectrum of a signal light whose power is high after Raman amplification.

12. The Raman amplification control method as set forth in claim 9, further including the steps of:
setting at least one of said various wavelengths to be a wavelength of a part of a spectrum of a signal light whose power is low after Raman amplification, and
controlling output power of said pumping light LD such that power of a spectrum at said monitoring wavelength which is set at a part of a spectrum of a signal light whose power is low attains a target value set in advance.

13. The Raman amplification control method as set forth in claim 9, further including the steps of:
setting at least one of said various wavelengths to be a wavelength of a part of a spectrum of a signal light whose power is high after Raman amplification, and
controlling output power of said pumping light LD such that power of spectra at a plurality of said monitoring wavelengths which are set at a part of a spectrum of a signal light whose power is high attains the same value.

14. The Raman amplification control method as set forth in claim 9, further including the steps of:
setting at least one of said various wavelengths to be a wavelength of a part of a spectrum of a signal light whose power is high after Raman amplification,
controlling output power of said pumping light LD such that power of spectra at a plurality of said monitoring wavelengths which are set at a part of a spectrum of a signal light whose power is high attains the same value, and
controlling output power of said pumping light LD which emits the pumping light that amplifies said signal light of said monitoring wavelength such that spectra at said plurality of monitoring wavelengths have no difference in power.

* * * * *